Oct. 22, 1968 H. BRESSLEIN ET AL 3,406,899

MULTIPLICATON ATTACHMENT FOR ADDING MACHINE

Filed May 8, 1967 2 Sheets-Sheet 1

Helmut Bresslein
Klaus Korte
INVENTORS.

BY

Karl F. Ross
Attorney

MULTIPLICATON ATTACHMENT FOR ADDING MACHINE

Filed May 8, 1967 2 Sheets-Sheet 2

Helmut Bresslein
Klaus Korte
INVENTOR.

BY

Karl F. Ross
Attorney

United States Patent Office 3,406,899
Patented Oct. 22, 1968

3,406,899
MULTIPLICATION ATTACHMENT FOR ADDING MACHINE

Helmut Bresslein, Middelsfahr, and Klaus Korte, Braunschweig, Germany, assignors to Firma Olympia Werke AG, Wilhelmshaven, Germany, a corporation of Germany Filed May 8, 1967, Ser. No. 636,719
Claims priority, application Germany, May 6, 1966, O 11,662
10 Claims. (Cl. 235—60)

ABSTRACT OF THE DISCLOSURE

Attachment for an adding machine having a shiftable pin carriage for registering a multiplicand which in successive digital carriage positions is to be repetitively entered in a totalizer under the control of respective digits of a multiplier stored in a register provided with a plurality of digital slides, a counting slide being oscillatable on a carrier to restore each digital slide step by step to its zero position whereupon the carrier advances to bring its counting slide into operative engagement with the next digital slide whose off-normal position represents a significant digit; the multiplier register is limitedly shiftable in a direction perpendicular to the slide motion, for a distance corresponding substantially to the spacing between successive digital slides, so as to be entrainable by the advancing carrier against the force of a restoring spring by the interengagement of the counting slide with an off-normal digital slide.

Our present invention relates to a calculating machine and, more particularly, to an assembly for the control of a digital register to enable the performance of multiplications with multidigit multipliers. Such an assembly may be used, for example, as an attachment to a conventional adding machine in which a number, referred to hereinafter as the multiplicand, can be entered by the usual pushbutton selector on a register which may be in the form of a conventional pin carriage adapted to transfer its content to the digit wheels of a totalizer for visual display and/or printing, e.g., through sliding racks engageable with the stop pins of the carriage and meshing with respective sector gears as is well known per se.

When such a machine is to be used for multiplication, the multiplicand stored in the carriage is repetitively transferred to the totalizer in a succession of operating cycles determined by the numerical value of a multiplier digit entered in a separate register; during each operating cycle, the element of the multiplier register (e.g., a slide) defining this particular digit is reset by a unit step until it reaches its zero position, whereupon the pin carriage is shifted into an adjoining denominational order or decade to repeat the process for the next multiplier digit. Provision is usually made also for a "no-add" mechanism which prevents the loading of the totalizer, as by blocking the engagement of its digit wheels with the sector gears of the transfer mechanism, whenever a multiplier digit has the value zero; in that case the pin carriage is shifted by one or more denominational orders until the next significant multiplier digit is encountered in the multiplier register by the linkage which controls the operation of the transfer mechanism.

The general object of our invention is to provide a simple assembly for use with conventional adding machines of the character described to perform multidigit multiplications.

In accordance with our invention, we provide a multiplier register whose operative elements are a plurality of parallel digital slides, in combination with an oscillatable counting slide mounted on a carrier which moves in a direction transverse to the digital slides to bring the counting slide successively into engagement with the several digital slides if the latter are in an off-normal position; as the counting slides oscillate in the rhythm of the main drive of the machine which also controls the loading of the totalizer by an associated multiplicand register such as a pin carriage, the engaged digital slide of the multiplier register is returned step by step to its zero position whereupon the counting slide moves into the path of the next digital slide wtih concurrent shifting of the pin carriage. This intermittent displacement of the two registers is performed by a stepping mechanism which must remain inactive as long as the counting slide is in the process of restoring an engaged digital slide of the multiplier register; for this purpose we provide an extension on the counting-slide carrier which tests the position of the digital slide aligned with the counting slide and, upon finding that digital slide in an off-normal position, displaces same together with the multiplier register in a transverse direction against the force of a restoring spring or the like. This displacement of the multiplier register, in turn, decouples the stepping mechanism for the slide carrier and the pin carriage from the main drive which is operatively coupled with that mechanism as long as the multiplier register is in its initial, undisplaced position. Thus, whenever the counting slide has restored an engaged digital slide to its zero position, the latter slide escapes from the carrier extension and allows the return of the register to its initial position, thereby restoring the connection between the machine drive and the stepping mechanism.

The same register motion can also be used, pursuant to another feature of our invention, to deactivate a "no-add" mechanism by decoupling a member thereof from the main drive whenever the multiplier register is not in its initial position.

Since a transverse shift of the pin carriage is not needed during the initial operating cycle in which the counting slide is brought into engagement with the first digital slide of the multiplier register, we provide, in accordance with a further feature of this invention, separate feed means directly controlled by the machine drive and independent of the carrier-stepping mechanism for initially advancing the slide carrier toward the first digital slide of the multiplier register. The feed means referred to may be a pair of coacting camming formations on the slide carrier and on an oscillatory member forming part of the main drive, this member moving parallel to the digital slides and carrying a transversely movable element which is operatively coupled with the multiplier register and forms part of the linkage by which the stepping mechanism is intermittently coupled with the drive member.

In order to eliminate the need for a complete movement of the slide carrier across the multiplier register when the final digit or digits of the multiplier are zero, we prefer to provide a sensing device which, upon the restoration of all digital slides to their zero position, moves toward the register to actuate and end-of-operation indicator which arrests the machine drive. This sensing device may be in the form of a bar swingable, e.g., by gravity or under spring action, about an axis perpendicular to the digital slides.

The above and other features of our invention will become more fully apparent from the following detailed description of a preferred embodiment, reference being made to the accompanying drawing in which.

Figures 2, 3:
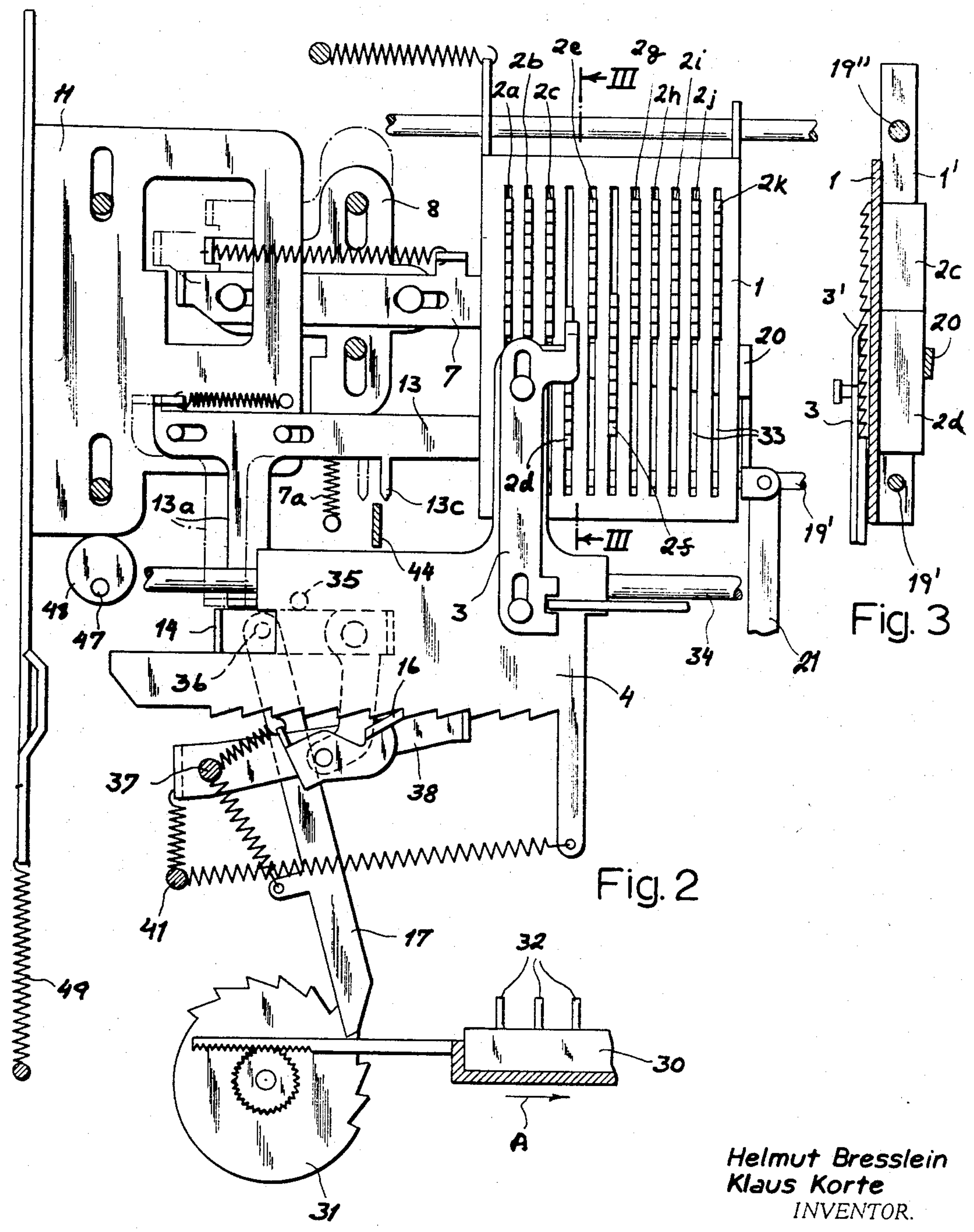
FIG. 2 is a view similar to FIG. 1, showing the elements of the assembly in a displaced position during performance of multiplication.
FIG. 3 is a sectional detail view taken on the line III—III of FIG. 2.

The multiplication unit shown in the drawing is designed to cooperate with a conventional adding machine having a totalizer controlled, in the known manner, by a pin carriage partly illustrated at 30 in FIG. 2. Under the control of a stepping pawl 17, engaging the teeth of a sector gear 31, this carriage can be progressively displaced toward the right as indicated by arrow A. A multiplicand registered on the pins 32 of carriage 30 can thus be repetitively entered on the totalizer in a starting position of the carriage and in as many other positions (here ten) as there are ratchet teeth, each carrier position representing a denominational order or decade of a selected multiplier; this particular machine, therefore, can handle multipliers with up to eleven significant digits.

The multiplier digits are entered, by conventional means not illustrated, in a register 1 which is essentially a flat plate with side flanges 1', 1'' and slots 33 for the guidance of eleven digital slides 2*a*, 2*b* . . . 2*k*. Register 1 is slidably guided, by its flanges 1', 1'', on a pair of transverse rods 19', 19''; a spring 6 urges the register 1 toward the left as viewed in FIGS. 1 and 2, thus tending to maintain it in an initial position illustrated in FIG. 1.

Each of the digital slides 2*a*, 2*b*, etc., is guided in its slot 33 with sufficient friction to remain, in the absence of external forces, in the position in which it has been set. Each slide projects both forwardly and rearwardly from its slotted plate 1, the forwardly projecting edge being formed with nine sawteeth engageable by a pawl 3' on a counting slide 3 which can move vertically, thus in the direction of the digital slides, on a carrier 4. An extension 5 of this carrier laterally confronts the toothed profile of any digital slide which does not occupy its zero position at the top of the respective slot 33. Carrier 4 is guided for horizontal motion, perpendicular to the slides 2*a*–2*k* and 3, on a plurality of mounting rods of which one has been designated 34.

The main drive of the machine, which controls the displacement of pin carriage 30 in a direction perpendicular to arrow A to load the totalizer, is also connected to a master slide 11 which is vertically oscillatable as indicated by arrow B. As particularly illustrated, this drive comprises a main shaft 47 with a cam 48 bearing upon the underside of slide 11 against the force of a downwardly acting spring 49. The same drive oscillates (arrow C), via a linkage of which only a rod 18 has been shown, the counting slide 3 on its carrier 4 to an extent just sufficient to let its pawl 3' move an engaged digital slide upwardly by one sawtooth during each operating cycle of the apparatus. An extension 11*a* of member 11 is provided with a camming formation 11*b* confronting a beveled corner 4*a* of slide carrier 4 when the latter is in its starting position shown in FIG. 1. The lower edge of this carrier is provided with a set of sawteeth 4*b* engageable by a stepping pawl 16 which is pivoted on a bell-crank lever 15 having a fixed fulcrum at 35. Stepping pawl 17 is articulated at 36 to the lever 15 and is urged upwardly by a spring 15*a* anchored to a fixed stud 37 about which a retaining pawl 38 is swingable; a pair of further springs 39 and 40, anchored to a fixed stud 41, respectively tend to swing the pawl 38 counterclockwise and urge the slide carrier 4 to the left as viewed in FIGS. 1 and 2. A stop 42 limits the upward movement of pawl 17, and thus the clockwise swing of lever 15, under the control of spring 15*a*. Another spring 15*b*, also anchored to stud 37, tends to maintain the pawl 16 in engagement with one of the sawteeth 4*b* of carrier 4.

A link 13 is mounted on master slide 11 with limited freedom of horizontal displacement relative thereto; the right-hand end of this link is urged by a spring 13*b* into contact with the left-hand edge 1' of register plate 1. Another bar 7 has its right-hand extremity in positive engagement with register flange 1' so as to be entrained thereby upon a movement of the register to the right, i.e., into the position of FIG. 2; such entrainment is resisted by a spring 7*b* which is anchored at one end to a lug on bar 7 and at its other end to a lug on a vertically slidable coupling element 8. The latter element, which is biased downwardly by a spring 7*a* anchored to a fixed stud 43, has an extension 12 which forms part of a "no-add" linkage effective, upon an upward displacement of element 8 to the limit of its vertical mobility, to block the transfer of the multiplicand from pin carriage 13 to the totalizer. A tab 9 at the left-hand end of bar 7 normally overlies a ledge 10 of drive member 11 for vertical entrainment of the "no-add" assembly 7, 8 by member 11 in the direction of arrow B. A similar tab 14 on lever 15 coacts with a depending arm 13*a* of link 13 to translate the vertical reciprocation of master slide 11 into a swing of lever 15 and a longitudinal oscillation of pawl 17. Link 13 also has a downwardly extending lug 13*c* which in the starting position of FIG. 1 lies to the left of a fixed abutment 44.

Rod 19 forms the pivotal axis for a sensing element 20 which extends across the width of register 1 and has a downward extension 21 hinged to it at 45. This extension 21 forms part of an end-of-multiplication indicator, not further illustrated, which arrests the drive member 11 by decoupling the cam 48 from its shaft 47; at the same time the reciprocations of counting slide 3 (arrow C) may be terminated in a similar manner. The weight of linkage 21 and/or a biased spring, not shown, tends to swing the bar 20 into contact with register plate 1, i.e., counterclockwise as in FIG. 3; bar 20 is prevented from completing its swing as long as at least one of the digital slides 2*a*–2*k* is displaced downwardly from its zero position, as illustrated in FIG. 3 for the bar 2*d*.

Figure 1:
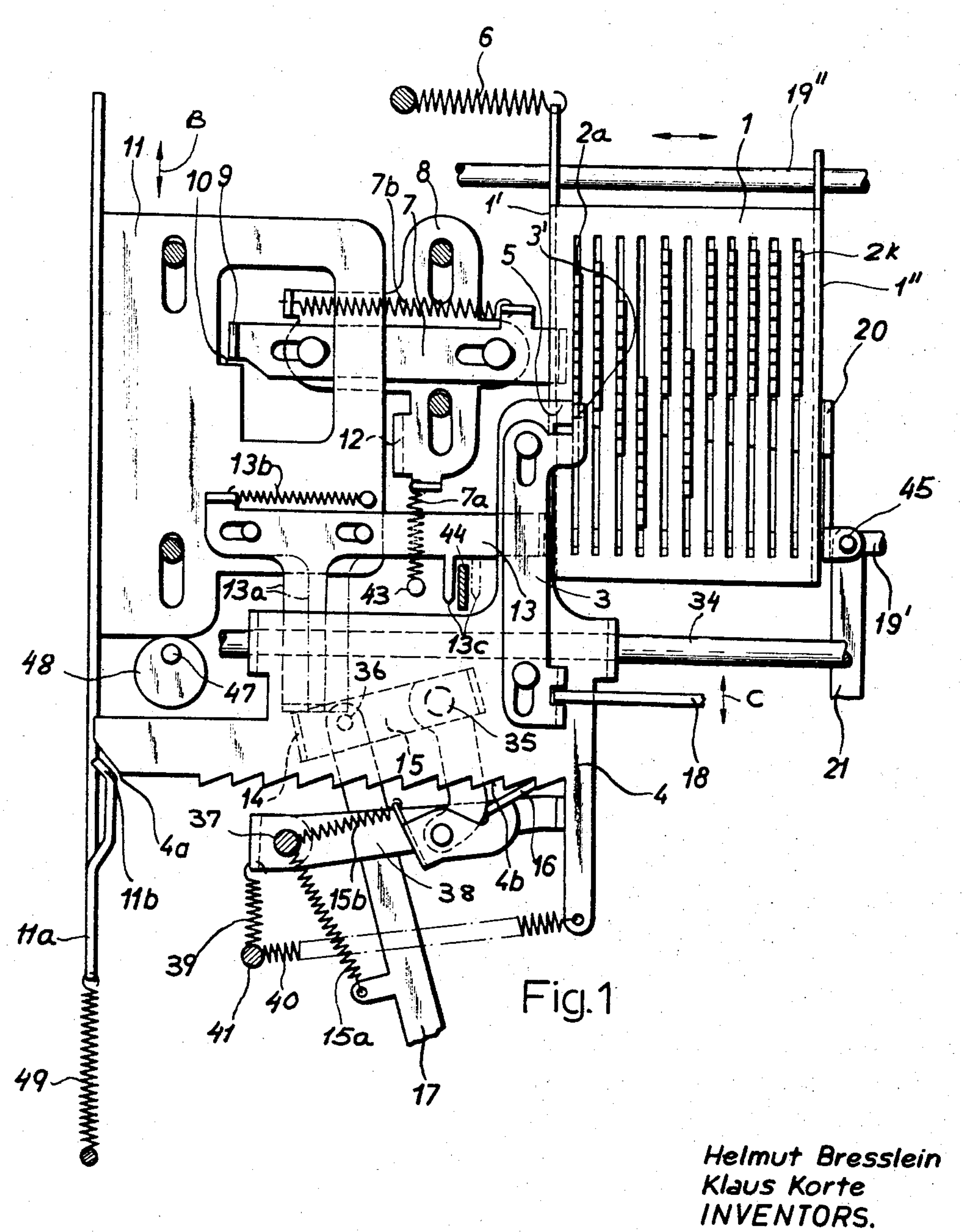
FIG. 1 is a face view (partly in section) of the elements of our multiplier assembly adapted to be used as an attachment for a conventional adding machine, in a starting position at the beginning of multiplication.

The operation of the system will now be described, starting with the position shown in FIG. 1; the means for disengaging the pawls 16 and 38 from the sawteeth 4*b*, in order to return the carrier 4 and the counting slide 3 to this starting position, have not been illustrated.

Let us assume by way of example that the register 1 has been preset to designate a multiplier 21490700000, the last five digits being considered insignificant. With the first digital slide 2*a* in an off-normal position to indicate the digit "2," extension 5 lies immediately to the left of one of the projecting sawteeth of that slide as seen in FIG. 1. Upon the actuation of a starter button or the like (not shown) to initiate the first operating cycle, cam drive 47, 48 is rendered effective to oscillate the master slide 11 concurrently with an oscillation of counting slide 3. The first upward stroke of member 11 swings the cam 11*b* thereof into engagement with bevel 4*a* of carrier 4 whereby the latter, together with slide 3, is immediately displaced to the right; this motion is communicated, via extension 5 and the confronting sawtooth of slide 2*a*, to the register 1 which is thus also moved to the right by a distance substantially corresponding to the spacing of its digital slides. Because of this rightward shift of register 1, the tab 9 of "no-add" bar 7 is disengaged from ledge 10 of master slide 11 in the initial phase of the upward stroke of the latter so that no effective movement of element 8 and linkage 12 occurs. Abutment 44 prevents bar 13 from also moving to the right, under the urging of its spring 13*b*, until the lug 13*c* clears this abutment in the top position of slide 11; at that instant the bar 13 shifts into its alternate position illustrated in full lines in FIG. 2.

During this motion, pawl 3' has reset the slide 2*a* by one tooth but the slide has not yet reached its zero position. Pawl 17, controlling the lateral displacement of pin carriage 13, has followed the rising motion of assembly 11, 13, 13*a* so as to drop behind the first ratchet tooth of wheel 31. Upon the subsequent descent of slide 11, however, arm 13*a* has moved out of alignment with tab 14 on lever 15 so that the latter, together with pawl 17, remains in its elevated position illustrated in FIG. 2;

thus, the carriage 30 is not stepped at this time. Slide carrier 4 also remains stationary at that stage, being held immobile against the force of spring 40 by the pawl 38 which has swung into engagement of the first right-hand sawtooth 4b at the end of the feed stroke performed by cam 11b; stepping pawl 16 has moved behind the second sawtooth to the left of the tooth engaged by retaining pawl 38 but, as long as lever 15 remains immobile against its stop 42, does not further advance the carrier 4 with its counting slide 3.

Upon the next oscillation of drive member 11 and slide 3, the same procedure is repeated but now the digital slide 2a reaches its zero position so as to clear the extension 5 of carrier 4. As the stroke of member 11 reaches its upper dead center, lug 13a (which now lies to the right of abutment 44 as shown in dot-dash lines in FIG. 1) is disengaged so that spring 13b can restore the bar 13 to the position of FIG. 1, with concurrent restoration of register 1 to its initial position by spring 6. Arm 13a thus again registers with tab 14 of lever 15 so that, upon the succeeding downstroke of member 11, lever 15 swings counterclockwise and depresses the pawl 17 which steps the ratchet 31 to shift the pin carriage 30 to the right into the next digital position. At the same time the pawl 16 advances the slide carrier 4 by one sawtooth 4b so that its extension 5, bearing upon off-normal slide 2b, again shifts the register 1 to the right whereupon the aforedescribed sequence of operations is repeated until slide 2b has returned to zero.

The digits represented by slides 2c and 2d are similarly counted, the system thereupon arriving in the position of FIG. 2 in which slides 2a, 2b, 2c are restored and slide 2d has been partly retracted.

During every preceding operating cycle the "no-add" assembly 7, 8 has remained inoperative by being held disengaged from ledge 10 of slide 11. Even during those cycles in which stepping lever 15 is tripped by the descending arm 13a, bar 7 contacts only the vertical edge of slide 11 extending downwardly from ledge 10. Upon the restoration of digital slide 2d to zero, however, extension 5 does not confront any part of the next digital slide 2e since the latter is already in its zero position. At this point, therefore, register 1 is not shifted from its initial position during the stepping of carrier 4 by pawl 16 so that, upon the immediately following upward stroke of drive member 11, bar 7 is entrained upwardly by ledge 10 and raises the coupling element 8 whereby extension 12 thereof performs the "no-add" operation. Immediately thereafter, with bar 13 held retracted by register 1 and abutment 44, lever 15 is tripped once more to step the slide 4 and the carriage 30; the counting of the digits represented by slide 2g then takes place in the aforedescribed manner.

As soon as slide 2g has been restored to zero, bar 20 detects the raised position of all eleven slides of register 1 and swings into place underneath these slides to actuate the end-of-multiplication indicator controlled by its extension 21.

Reference may be made to our commonly assigned application Ser. No. 636,720 of even date, disclosing the tripping of an otherwise manually actuatable summing button of an adding machine under the control of an end-of-multiplication lever which may be coupled with the element 21 shown in present FIGS. 1 and 2.

Furthermore, the stepping pawl 17 for the carriage drive may be used to trip a blocking device for the product printer of the calculator, as disclosed in our commonly assigned application Ser. No. 636,718 of even date, if the capacity of the machine is exceeded, i.e., if the end-of-multiplication indicator is not tripped before the pin carriage arrives in its terminal position (extreme right in FIG. 2).

Naturally, the system described and illustrated admits of many modifications readily apparent to persons skilled in the art without departing from the spirit and scope of our invention as defined in the appended claims.

We claim:

1. In a calculator provided with shiftable storage means for a multiplicand to be repetitively entered in a totalizer, in successive digital positions under the control of respective digits of a multidigit multiplier, the combination therewith of:

a multiplier register comprising a plurality of parallel digital slides each representing, by its displacement from a zero position, the value of a respective multiplier digit;

a carrier movable in a direction perpendicular to said digital slides;

a counting slide on said carrier oscillatable in a direction parallel to said digital slides and engageable with any digital slide in an off-normal position for stepwise restoration thereof of its zero position;

drive means for oscillating said counting slide in timed relationship with the loading of the totalizer by said storage means;

first stepping means for progressively advancing said carrier into successive alignment of said counting slide with the path of each digital slide, said multiplier register being limitedly displaceable in the direction of carrier motion by the engagement of an extension of the advancing carrier with a digital slide in an off-normal position;

restoring means for returning said multiplier register to its initial position upon the return of an engaged digital slide to its zero position;

link means coupled with said multiplier register for operatively connecting said first stepping means with said drive means only in the initial position of said register whereby said first stepping means remains inoperative in a displaced position of said register until the engaged digital slide returns to its zero position; and second stepping means coupled with said first stepping means for shifting said storage means in step with the advance of said carrier.

2. The combination defined in claim 1, further comprising feed means coupled with said drive means independently of said first stepping means for moving said carrier out of its home position to engage said extension and counting slide with the first digital slide in the first oscillatory cycle of said drive means.

3. The combination defined in claim 2 wherein said drive means comprises a member slidable in a direction parallel to said digital slides, said feed means including coacting camming formations on said member and said carrier.

4. The combination defined in claim 1 wherein said carrier is provided with a toothed edge, said first stepping means including a pawl engageable with said toothed edge and a swingable support for said pawl engageable by said link means in the initial position of said multiplier register.

5. The combination defined in claim 4 wherein said drive means comprises a member slidable in a direction parallel to said digital slides, said link means including an element mounted on said member with freedom of limited displacement in the direction of carrier motion.

6. The combination defined in claim 1, further comprising an element normally coupled with said drive means for entrainment thereby to block the loading of the totalizer, said element being linked with said multiplier register for decoupling from said drive means upon a movement of said multiplier register out of its initial position.

7. The combination defined in claim 6 wherein said drive means comprises a member slidable in a direction parallel to said digital slides, said element being mounted for limited motion both parallel to said digital slides and transversely thereto, said element and member being provided with formations coacting in the initial position of said multiplier register for transmitting the oscillatory motion of said member to said element.

8. The combination defined in claim 1, further including a sensing element biased to move into a position adjacent said multiplier register upon restoration of all digital slides to their zero positions, and mechnism coupled with said sensing element for arresting said drive means upon such movement of said sensing element.

9. The combination defined in claim 8 wherein said sensing element comprises a bar swingable about an axis transverse to said digital slides.

10. The combination defined in claim 1 wherein said storage means comprises a pin carriage.

References Cited

UNITED STATES PATENTS

| | | | |
|---|---|---|---|
| 3,308,259 | 1/1943 | Atwater | 235—61 |
| 3,005,585 | 10/1961 | Capellard et al. | 235—60 |
| 3,167,246 | 1/1965 | Edeböck | 235—60 |
| 3,319,883 | 5/1967 | Theuis | 235—60 |

RICHARD B. WILKINSON, *Primary Examiner.*

S. A. WAL, *Assistant Examiner.*